April 1, 1969     L. DUTHION ET AL     3,436,020
JET ENGINE EXHAUST SILENCER

United States Patent Office 3,436,020
Patented Apr. 1, 1969

3,436,020
JET ENGINE EXHAUST SILENCER
Louis Duthion, Paris, Michel Serge Daniel Hafenscher, Neuilly-sur-Seine, and André Emile Roger Cabassut, Versailles, France, assignors to Societe Bertin & Cie, Paris, France, a French body corporate
Filed Dec. 6, 1966, Ser. No. 599,529
Claims priority, application France, Dec. 13, 1965, 42,043
Int. Cl. B64d 33/06; B63h 11/10
U.S. Cl. 239—265.13                 8 Claims

ABSTRACT OF THE DISCLOSURE

A gas ejection system for a jet engine having a first nozzle element adapted to receive an axial flow of gas and containing longitudinal corrugations and, a second nozzle element having radial walls arranged at the outlet of said first element and being inwardly offset at their leading edges with respect to the trailing edges of said first element whereby intaken air may flow between adjacent radial walls and the exhaust gas stream from in between the corrugations.

It is well known that when required to minimise losses while using a jet having a high expansion ratio, a divergent nozzle adapted to such expansion ratio must be used.

This invention relates to a silencer intended more particularly for jet engines and, inter alia, supersonic aircraft power units, the said silencer comprising a convergent element delivering a jet divided into radial sections and a divergent element having radial walls disposed on each side of each section of the jet and forming an elemental divergent element for the said section. This divergent element is advantageously adjustable.

The divergence can then be fixed for the highest expansion ratio without interfering with operation at the lowest expansion ratios. In fact, the access of atmospheric air to the stream immediately downstream of the neck prevents a prohibitive burst, and the slowing down of the boundary layers because of dilution with the intaken air will prevent cavitation in the region of the divergent element outlet. Also, this dilution will reduce frictional losses and noise.

The invention will be more readily understood from the following description with reference to the accompanying drawings, which are given by way of example without limiting force, and the features apparent from the drawings and text naturally form part of the invention.

Figure 1:
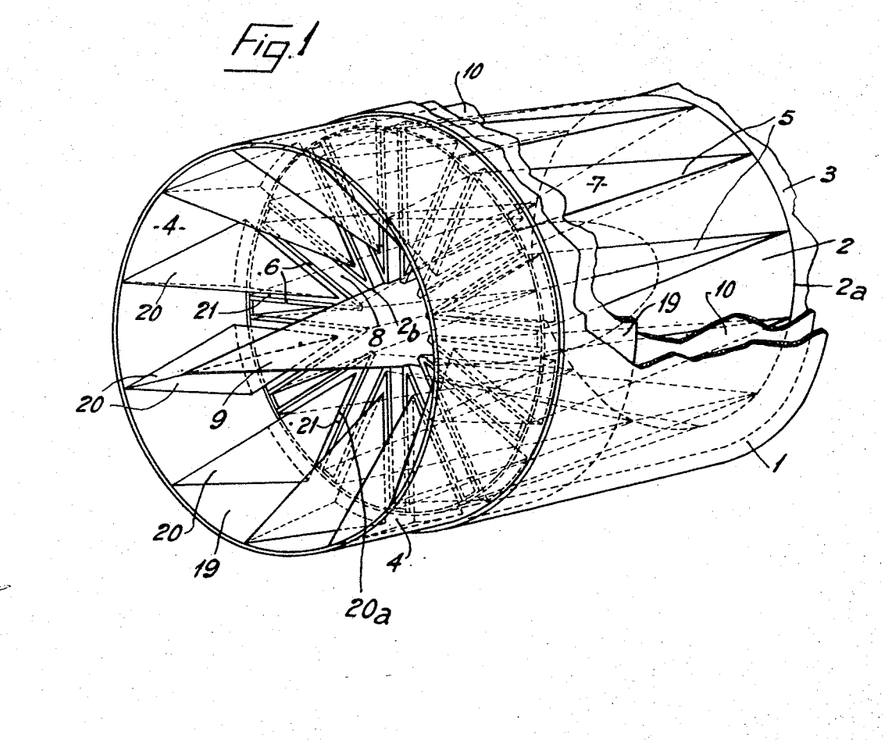
FIG. 1 is a diagrammatic fragmentary view of a silencer according to the invention.

In the example illustrated in FIG. 1, the silencer which, for example, is mounted in the cowling 1 of an aircraft by fastening means (not shown), comprises essentially a convergent element 2 connected to the exhaust pipe 3 of the engine to which the silencer is fitted, and a divergent element 4 coaxial with the convergent element.

The convergent element has a cylindrical or prismatic peripheral wall in which corrugations 5 are formed, said corrugations being substantially in the form of dihedra symmetrical with respect to a plane passing through the axis of the silencer.

The said corrugations are distributed uniformly around said axis. They originate at the inlet section 2a of the convergent element and their section increases uniformly to the outlet section 2b of said convergent element.

The corrugations 5 may have various forms. Their substantially radial walls 6 may, for example, be flat as shown in FIGS. 1, 3, 4 and 6. They may be curved, as shown in FIG. 2, and they may even have a longitudinal section in the form of a convergent-divergent nozzle as shown in FIG. 5, whereby a portion of the divergent element 4 can be incorporated in the convergent element 2.

Figure 3:
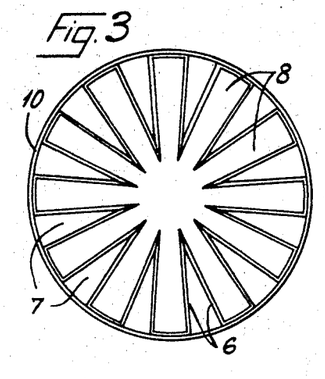
Figure 4:
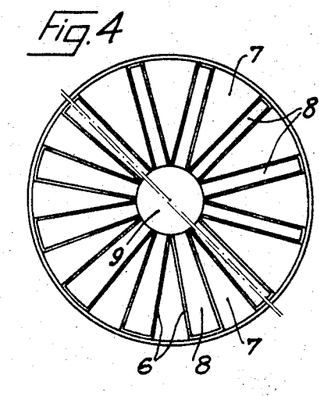
Figures 5, 5A:
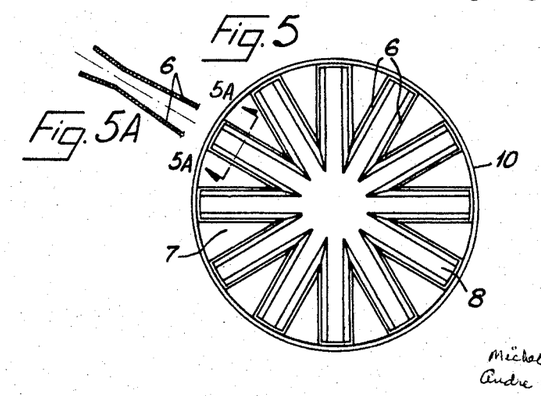
FIG. 5A is a sectional view taken along line 5A—5A of FIG. 5.

The said walls 6 may terminate to a parallel configuration (FIGS. 1, 4 at top and 5); outwardly divergent (FIGS. 3, 4 at bottom and 6). The corrugations 5 form passages 7 outside the convergent element, these passages being intended for the intaken air, and they also form inner passages 8 for the gases, said inner passages dividing the latter into radial sections.

Figure 2:
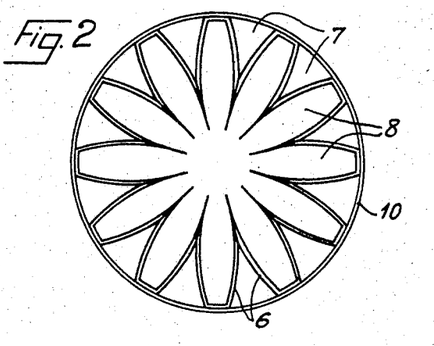
FIGS. 2 to 6 illustrate the outlet surface of the convergent element to show some examples of the arrangement of the corrugations thereof.

The curved arrangement shown in FIG. 2, wherein the wall concavity extends towards the passages 8 for the gases, enables the deformation of the walls due to the pressure of the gases to be reduced.

Figure 6:
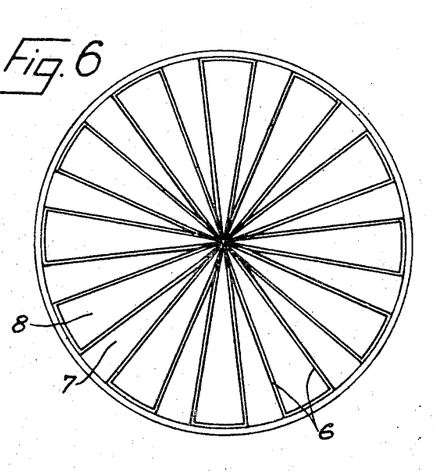

To reinforce the convergent element, the ends of the walls 6 may be connected to a member 9 of aerodynamic profile disposed coaxially with the silencer, as shown in FIGS. 1 and 4. The said walls may also be continued as far as the axis of the convergent element as shown in FIG. 6. The convergent element may be reinforced by peripheral wall elements which at least partially cover the corrugations and, more particularly, it may be surrounded by a cylindrical or prismatic reinforcing ring 10, the upstream edge of which may be outwardly raised to promote the induction of external air.

Figure 7:
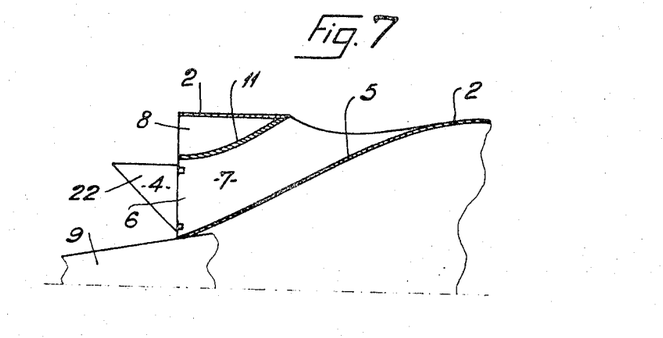
FIG. 7 is a partial axial section showing a variant corrugation.

As will be seen from FIG. 7, the walls 6 in each passage 7 may be shortened in the radial direction and said walls may be connected in pairs by a peripheral element 11 which curves outwardly and in the upstream direction so as to convert each passage 7 into a true air induction conduit completely surrounded by the passages 8 for the gases.

Figures 8, 9:
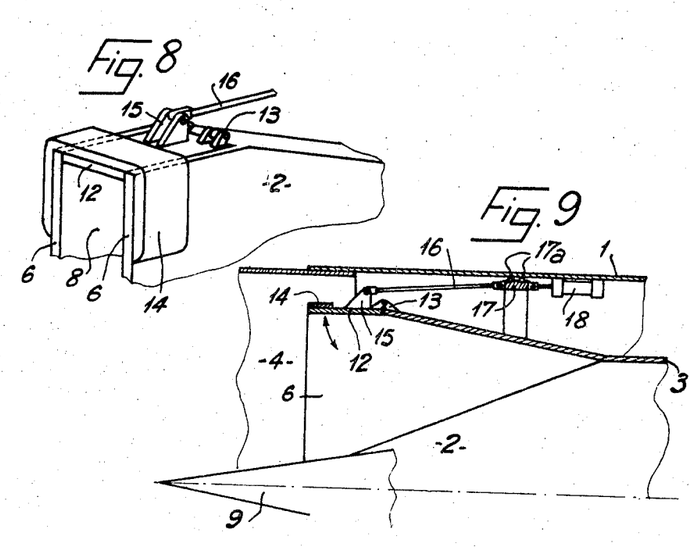
FIG. 8 is a partial perspective and FIG. 9 is a partial axial section of a variant convergent element having a variable outlet section.

Referring now to FIGS. 8 and 9, at each of the passages 8 for the gases the outlet end of the peripheral wall of the convergent element may have a flap 12 pivotally connected to the said wall by hinges 13 so as to be rockable between the radial walls 6. A stop strut 14 straddling the walls 6 limits the outward movement of the flap 12. Each flap 12 bears a clevis 15 to which a link 16 is pivotally connected, said link 16 being connected to a ring 17 slidable in the cowling 1 on balls 17a (FIG. 9). A jack 18 enables the ring 17 to be moved for adjustment of the outlet section of the convergent element by adjustment of the flaps 12, intaken air currents passing between the flaps and the strut 14 if necessary.

The above-described convergent element divides the gas stream into radial sections between which the external air is taken in, and it reduces noise.

The convergent element is combined with the divergent element 4 which, referring to FIG. 1, consists essentially of radial walls 20 which form dihedra opposite each of the passages 7 of the convergent element 2, the oblique edge of these dihedra originating from the periphery of the silencer and terminating near the base of the corresponding passage 7. As will also be apparent from FIG. 1, the radial walls 20 may extend beyond the periphery of the convergent element 2 and the divergent element 4 may be surrounded by a ring 19 in contact with the edges of the walls 20. The upstream edge of ring 19 may be raised to facilitate air induction, particularly when the silencer is used in a ground installation. When the silencer is used on an aircraft, the ring 19 need not be enclosed in the aircraft cowling and may have a larger diameter than the cowling.

The walls 20 stop substantially in the outlet plane 2b of the convergent element 2. Their edges 20a are offset in relation to the walls 6 of the convergent element towards the interior of the passages 7 so as to form slots 21 for the induction of external air to the gas sections on each side of the gas outlet passages 8.

It should be noted that even in the absence of intaken air, i.e., if the walls 20 were connected to the walls 6, there would already be a substantial attenuation of the noise because the reflections on the radial walls favourably change the natural organisation of the waves at the outlet of the neck of the convergent-divergent passages.

Figure 10:
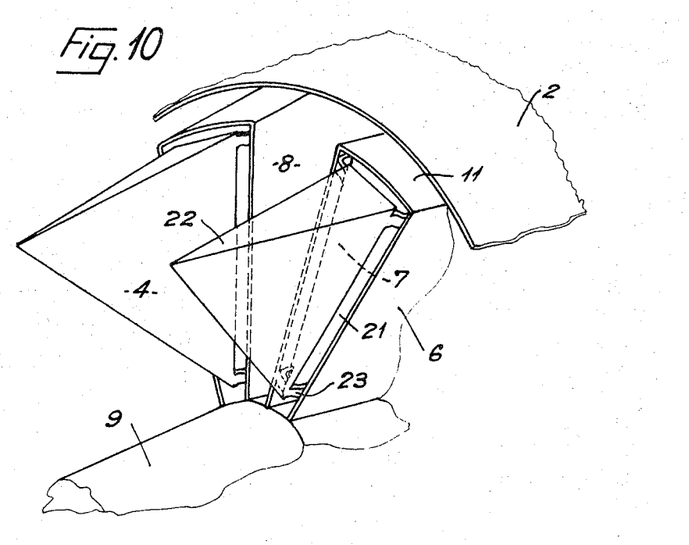
FIG. 10 is a partial perspective showing a variant divergent element applied to the convergent element shown in FIG. 7.

FIG. 10 shows a variant divergent element wherein the walls 20 form part of tetrahedra 22 secured by fastening means 23 to the walls 6 in front of the passages 7 for the intaken air and on each side of the gas outlet passages 8 so as to form the above-mentioned induction slots 21. This variant is in this case combined with the convergent element shown in FIG. 7.

Referring to FIGS. 11 to 14, the radial walls 20 of the divergent element may be continued in the upstream direction by other walls 24 which penetrate into the corrugations 5 so as to form a laminar passage for intaken air in the said corrugations.

Figure 11:
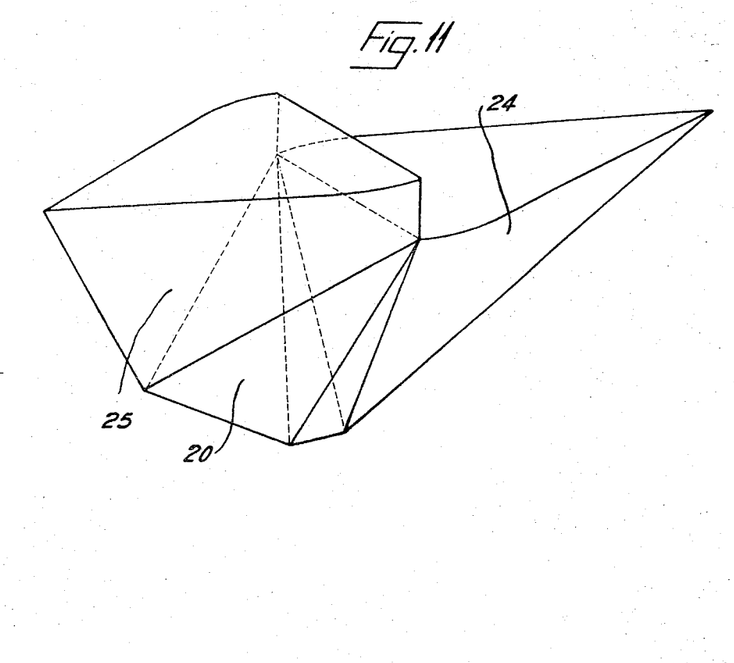
FIG. 11 is a partial perspective view of a core for the divergent element.
Figures 13, 14:
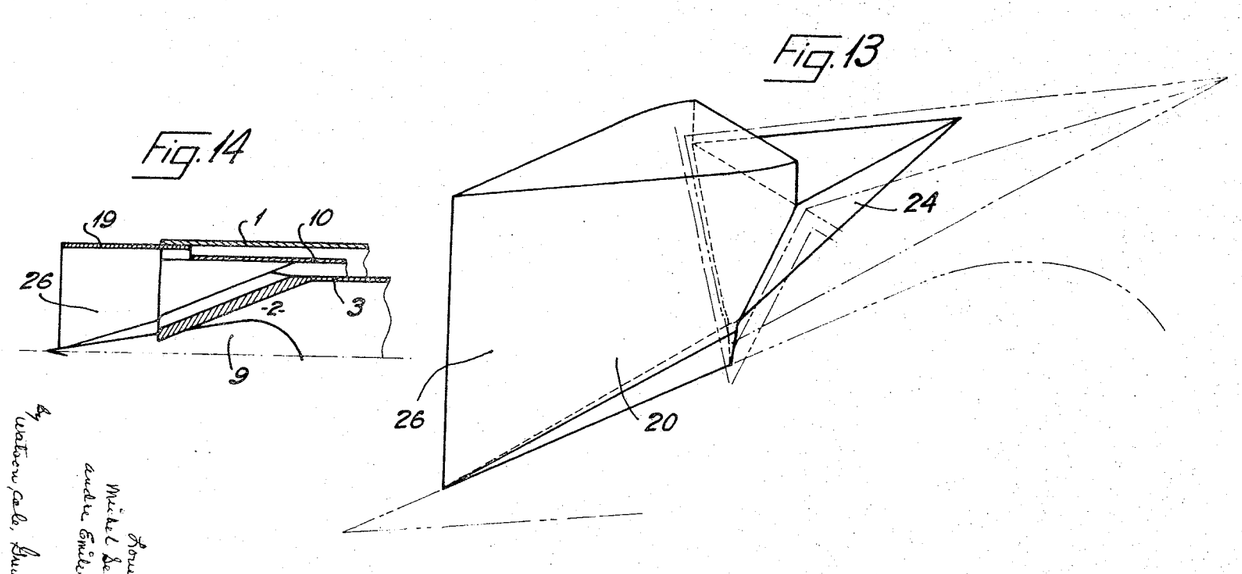
FIG. 13 is a similar view to FIG. 11
FIG. 14 is a similar view to FIG. 12 but showing a variant core.

The divergent element can thus be formed by solids or cores 25 or 26 of varying complexity of shape, as shown in FIGS. 11 and 13.

Figure 12:
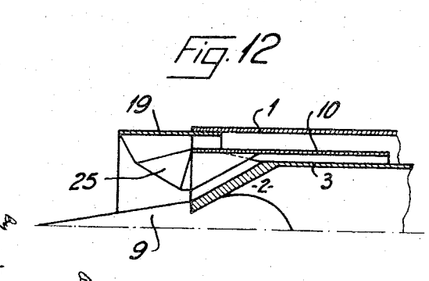
FIG. 12 is a partial axial section showing how this core is fitted.

These solids or cores may be attached to the ring 19 connected to the cowling 1 and/or to the ring 10 surrounding the convergent element 2 (FIGS. 12 and 14).

FIGS. 15 to 18 show variants wherein the cores are no longer fixed to the ring 19 but are articulated by hinges 28 on the ring 10 so as to be either extended or retracted varying amounts in the corresponding corrugations of the convergent element 2 in order to enable the divergent element to be adapted to varying expansion ratios in accordance with the method of the invention.

Figure 15:
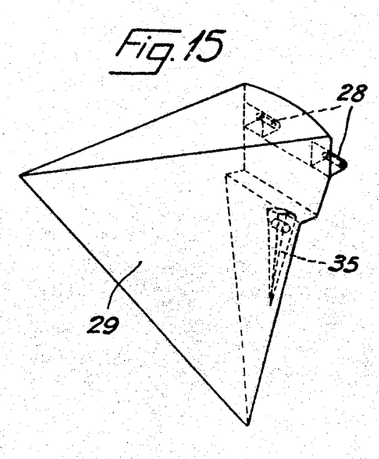
FIG. 15 is a partial perspective view of a rectractable core.
Figure 16:
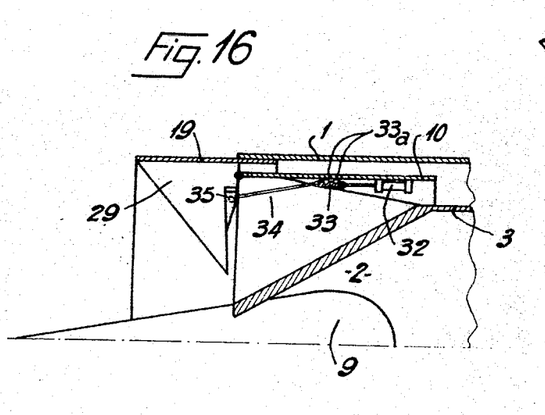
FIG. 16 is a partial axial section showing the fitting of this core.
Figure 17:
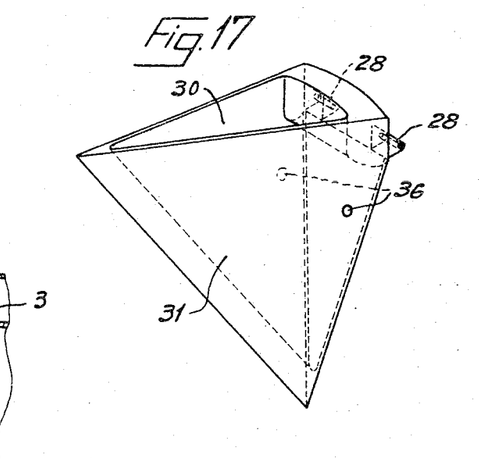
FIGS. 17 and 18 are similar views to FIGS. 15 and 16 but show a variant retractable core.
Figure 18:
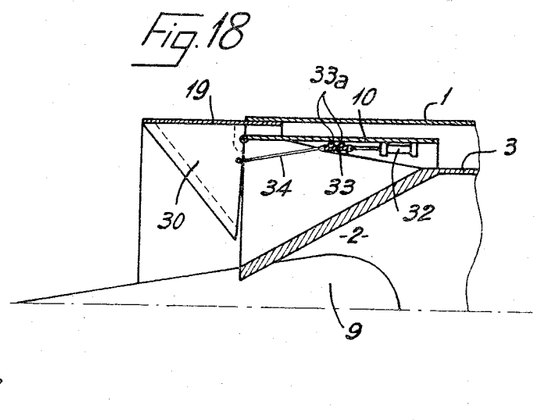
Figure 19:
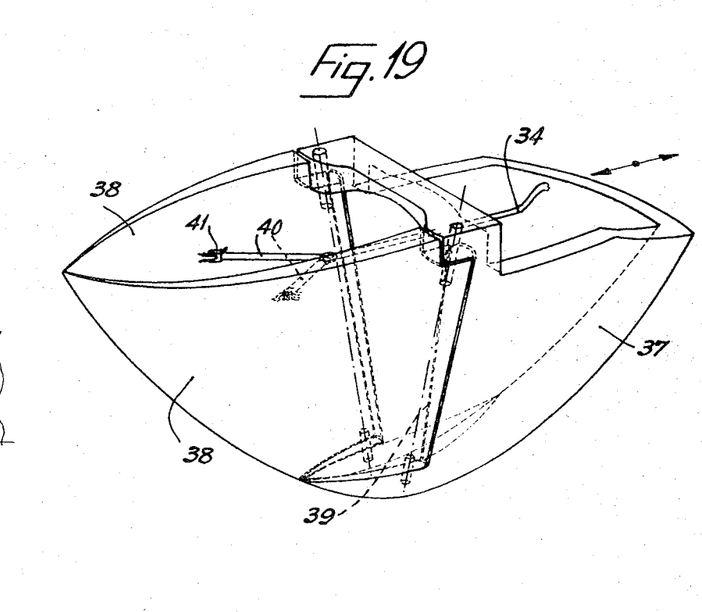
FIG. 19 is a perspective view of an opening core.
Figure 20:
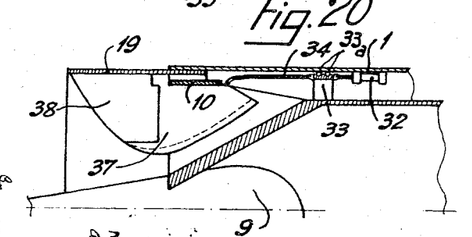
FIG. 20 is a partial axial section showing how this core is fitted.
Figure 21:
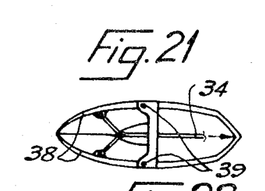
FIGS. 21 and 22 are diagrams respectively showing the core closed and open.
Figure 22:
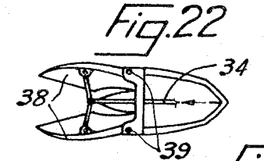

The core may have solid surfaces like the core 29 shown in FIGS. 15 and 16 or hollow surfaces so as to form a supplementary intaken air passage 30 when the said core is retracted in the corrugation of the convergent element, as is the core 31 in FIGS. 17 and 18.

Retraction or extension of the cores 29 or 31 is by means of a jack 32 actuating a ring 33 sliding on balls 33a and connected to the cores by means of links 34.

The links 34 are connected to the cores 29 by clevises 35 and to the cores 31 by means of holes 36.

It may be advantageous to retract the cores for relatively low gas expansion ratios.

In FIGS. 19 to 22, the cores 37 of the convergent element have opening downstream walls 38 pivotally connected to the rest of the core on pivots 39 and thus enabling the above method to be applied. Opening (FIG. 22) and closure (FIG. 21) of the walls 38 is controlled—as in the previous examples—by means of a jack 32, a ring 33 and links 34, the latter being pivotally connected to links 40 which are in turn pivotally connected to clevises 41 borne by the opening walls 38.

When these walls are opened, they provide an additional passage for the external air.

Figures 23, 24:
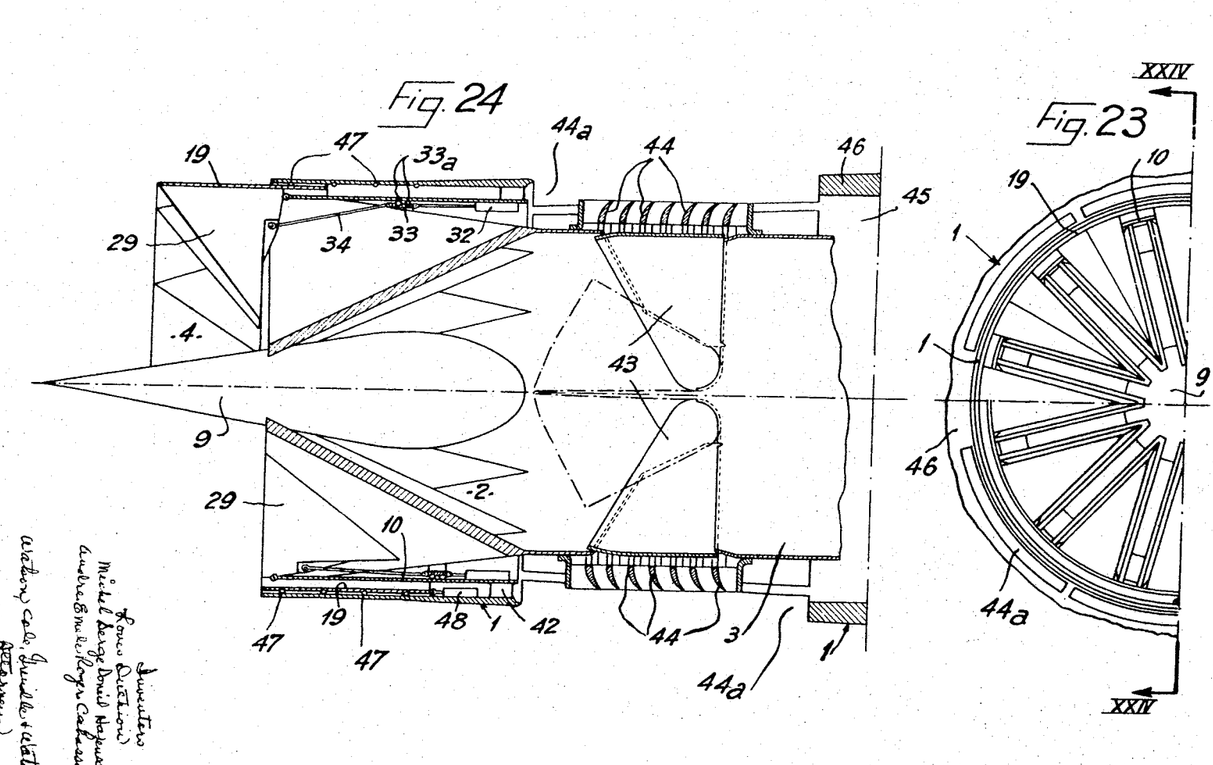
FIG. 23 is an end view and FIG. 24 is a section on the line XXIV—XXIV in FIG. 23 to show another silencer embodiment.

FIGS. 23 and 24 show a variant silencer wherein the peripheral ring 10 of the convergent element 2 is connected to the cowling 1 by ribs 42.

Upstream, the convergent element 2 is connected to the base 3 of the jet engine. Said base has a reversion device for the jet, said device comprising pivotable vanes 43 associated with the blade rings 44 situated in register with apertures 44a for the induction of fresh air when the vanes 43 are in the position shown in solid lines and which can be closed during cruising by means of movable flaps (not shown). The intaken air can then be provided by drawing from the boundary layer on the cowling upstream of the device illustrated.

A passage 45 is formed between the exhaust pipe 3 and the front portion 46 of the cowling 1 for the fresh air originating, for example, from boundary layer traps (not shown).

The outer ring 19 of the divergent element 4 is in this case shown as being slidable, e.g., through the agency of balls or rollers 47, inside the rear ring of the cowling 1. A jack 48 enables it to be retracted and extended.

The radial surfaces of the divergent element are in this case provided by retractable cores 29 operated by a jack device 32–34 of the type described with reference to FIGS. 15 and 16.

In the top half of the figure, the ring 19 is extended while in the bottom half it is retracted.

Figure 25:
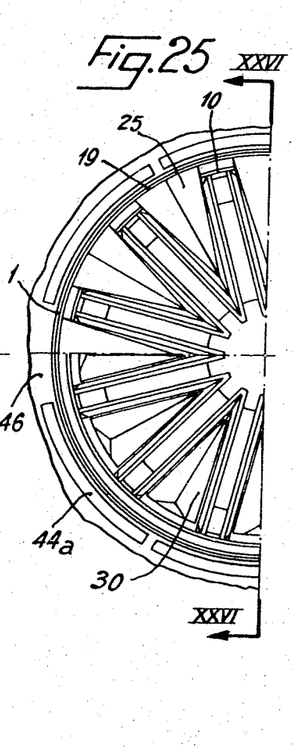
FIGS. 25 and 26 are similar views to FIGS. 23 and 24, but relate to a variant.
Figure 26:
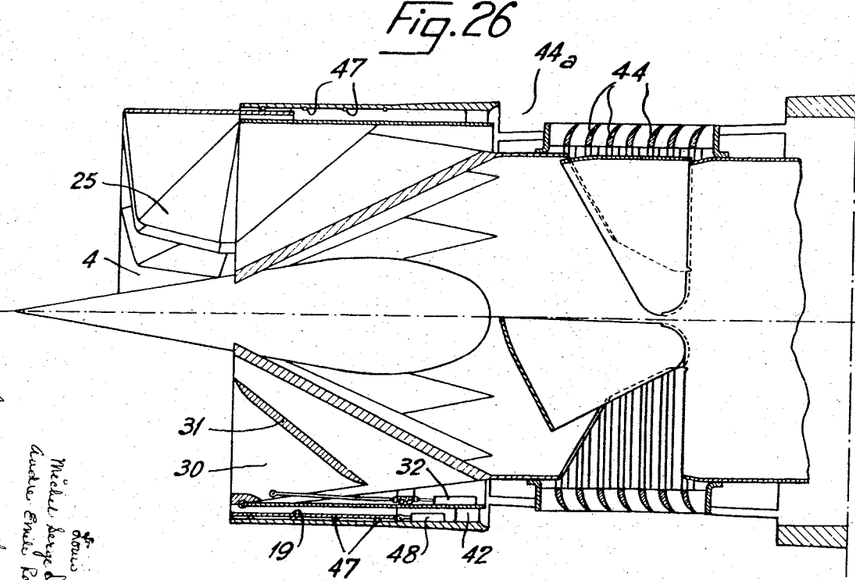

FIGS. 25 and 26 show a similar silencer to the previous one. The top half-section of these figures shows cores 25 of the type illustrated in FIGS. 11 and 12 while the bottom half-section shows cores 31 of the type described with reference to FIGS. 17 and 18.

Of course modifications may be made to the above-described embodiments, more particularly by the substitution of equivalent technical means, without thereby departing from the scope of the invention.

We claim:
1. A gas ejection system intended more particularly for a jet engine and comprising in combination:
  a first nozzle element adapted to receive an axial flow of gas and containing longitudinal corrugations distributed over its periphery, the depth of the corrugations increasing in the direction of the flow of the gases through said element, said corrugations bounding substantially radial walls in the vicinity of the outlet orifice of said element, said walls alternately forming elemental outlet passages for the gases and inlet passages for the air intaken by said gases; and
  a second nozzle element which forms the continuation of the first element and is arranged at the outlet thereof, said second element comprising a system of bodies including substantially radial walls respectively situated in register with said inlet passages for the intaken air, said scond element radial walls of each body converging downstream of said gases, ring means rigidly connecting the trailing edges of said second element walls to each other, the leading edges of said second element walls being offset with respect to the trailing edges of said walls of said corrugations towards the inner part of said inlet pas- sages, whereby the air intaken by said inlet passages flows both between said gas stream and adjacent radial walls of said bodies, and mixes with said gas stream.

2. A system as claimed in claim 1, wherein said radial walls of said corrugations are flared towards the periphery of the first element.

3. A system as claimed in claim 1, wherein a peripheral wall element is provided at the downstream end of each of said elemental passages, said wall element comprising a flap pivoted at its upstream edge so as to be movable between said radial walls of said corrugations in order to vary the outlet section of said first element and permit the passage of intaken air between said radial walls of said corrugations outside said wall element.

4. A system as claimed in claim 3 further including a movable ring, a plurality of rods interconnecting each of said flaps with said ring, and a jack on said ring for moving said ring and said connected flaps.

5. A system as claimed in claim 1, wherein said radial walls of said second element have upstream ends located wholly within respective corrugations of said first element.

6. A system as claimed in claim 1, wherein the downstream ends of said corrugations are substantially covered over by a wall means extending between two adjacent elemental passages.

7. A system according to claim 6 further including a first fixed ring surrounding the downstream end of said first nozzle element and coaxial therewith, said wall means being secured to said fixed ring and the upstream edge of said wall means being raised to promote induction of air by the stream of gas.

8. A gas ejection system intended more particularly for a jet engine and comprising in combination:

a first nozzle element adapted to receive an axial flow of gas and containing longitudinal corrugations distributed over its periphery, the depth of the corrugations increasing in the direction of flow of the gases through the said element, said corrugations bounding substantially radial walls in the vicinity of the outlet orifice of said element, the said walls alternately forming elemental outlet passages for the gases and inlet passages for the air intaken by said gases;

a second nozzle element which forms the continuation of the first element and is disposed at the outlet thereof, the said second element comprising substantially radial wall systems respectively situated in register with the entry passages for the intaken air, the walls of each system converging in the direction of flow of the gases and their leading edge being spaced from the trailing edge of the walls of the corrugations so as to enable the intaken air to follow the air entry passages to mix with the gas stream, said radial walls of said second element being mounted to be pivotable about transverse axes disposed near the outer periphery of the said element so that said second element walls can be retracted at least partially into the corrugation in continuation of which they are situated.

References Cited
UNITED STATES PATENTS

| | | | |
|---|---|---|---|
| 2,940,252 | 6/1960 | Reinhart | 239—265.13 X |
| 2,998,092 | 8/1961 | Brown. | |
| 3,027,714 | 4/1962 | Parker | 239—265.13 X |
| 3,060,681 | 10/1962 | Morley et al. | |
| 3,133,412 | 5/1964 | Westley | 239—265.39 |

M. HENSON WOOD, JR., *Primary Examiner.*

HOWARD NATTER, *Assistant Examiner.*

U.S. Cl. X.R.

181—51; 239—265.17, 265.19, 265.33